United States Patent [19]
Brown

[11] Patent Number: 5,078,095
[45] Date of Patent: Jan. 7, 1992

[54] BREEDING BOX FOR TEMPORIZING MALE AGGRESSION

[76] Inventor: James D. Brown, 1183 4th Ave., Napa, Calif. 94558

[21] Appl. No.: 568,178

[22] Filed: Aug. 16, 1990

[51] Int. Cl.$^5$ .............................................. A01K 31/06
[52] U.S. Cl. ............................................... 119/17
[58] Field of Search ............................... 119/17, 21

[56] References Cited

U.S. PATENT DOCUMENTS

| | | | |
|---|---|---|---|
| 1,936,978 | 11/1933 | Casey | 119/17 X |
| 2,725,851 | 12/1955 | Futterer | 119/17 |
| 2,822,780 | 2/1958 | Buell | 119/17 |

FOREIGN PATENT DOCUMENTS

| | | | |
|---|---|---|---|
| 791000 | 2/1958 | United Kingdom | 119/17 |
| 1102995 | 2/1968 | United Kingdom | 119/21 |

Primary Examiner—Robert P. Swiatek
Attorney, Agent, or Firm—Harold D. Messner

[57] ABSTRACT

The present invention relates to a breeding box that temporizes aggression of strong beaked exotic birds. In one aspect, the assembled box comprises a Tee-shaped central section having a pair of parallel arms defining a pair of spaced apart anteroom regions each connected by an opening to flight cage. Connected to the pair of parallel arms is a nesting arm for the female normal to the pair of arms and positioned below the latter. At the junction of three arms is a Tee-shaped baffle having a planar and a vertical element that limits direct passage of the male from parallel arm to parallel arm (bypassing the nesting arm), as when the female is escaping from the nest. That is, the vertical element forms a solid wall defining a vertical plane intersecting the nesting arm, while the parallel element limits passage height for the male that only permits him to crawl down into the nesting arm with his head exposed via a ladder. In addition, the planar element is long enough of overhang the anteroom regions to provide reduced crawl space that also limits the speed that the male can tranverse the same. Thus when the male first enters the breeding box via one of the openings to the anteroom region, the female has ample time to escape via the unoccupied anteroom region and then through the opening to the flight cage. A method of use is also described.

18 Claims, 4 Drawing Sheets

BREEDING BOX FOR TEMPORIZING MALE AGGRESSION

This invention relates to breeding boxes for exotic, strong beaked birds such as cockatoos and the like, and more particularly to such boxes that aid in temporizing aggression of males of such species in captivity that would interrupt the environment needed for completion of the breeding cycle.

BACKGROUND OF THE INVENTION

Importation of exotic birds in the United States has now been limited by law as well as by circumstances associated with destruction of the tropical forests of the world. Hence, many importers are turning to domestic breeders to maintain an adequate supply. However, in attempting to create a domestic breeding environment, especially one related to more expensive rare birds such as cockatoos, many breeders have found that their efforts are uneconomic. Often, costs escalate because of the need for human supervision of the breeding boxes. It has been found that the males of the specie are difficult to control during the breeding cycle. They have very strong beaks and are often very aggressive during the breeding season. The mating behavior of males is dominant and he will often attempt to corner the female in the breeding box and attack her with his strong beak to force copulation. If not then separated from the female, the male can so disrupt the breeding cycle that the female is kept from incubating, turning and ultimately hatching the eggs. Hence, there is a need to provide a temporizing breeding environment for strong beaked exotic birds, viz., cockatoos, that permits the female to nest but nevertheless, during the male's fits of aggression (usually of short duration) allows her the opportunity to escape the nesting region unhurt. She can later return to her eggs after the male's aggression subsides.

SUMMARY OF THE INVENTION

The present invention relates to a breeding box that temporizes aggression of strong beaked exotic birds. In one aspect, the assembled box comprises a Tee-shaped central section having a pair of parallel arms defining a pair of spaced apart anteroom regions (each connected by a passageway to a flight cage).

Connected to the parallel arms is a nesting arm segment normal to the pair of arms and positioned below the latter. The nesting arm provides the nest for the female. At the junction of three arms is a Tee-shaped baffle having a planar element parallel to the axis of symmetry of the pair of parallel arms but normal to that of the nesting arm, and an upright element extending from the planar element into full edge contact with the parallel arms above the nesting arm. The purpose of the Tee-shaped baffle: to limit direct passage of the male from parallel arm to parallel arm (bypassing the nesting arm), as when the female is escaping from the nest. It does this by the fact that the vertical element forms a solid wall defining a vertical plane intersecting the nesting arm, while the parallel element limits passage height for the male to a value h that only permits him to crawl down into the nesting arm with his head exposed via a ladder attached to the wall of the nesting arm. In addition, the planar element is long enough of overhang complimentary parts of the anteroom regions to provide reduced crawl space that limits the speed that the male can traverse the same. If the span (width) of the nesting arm is about 11¼ inches, the height h of the planar element above the anteroom floor should be about 5½ inches. Each overhang should be about 3¼ inches. Thus when the male first enters the breeding box via one of the openings to the anteroom region, the female has ample time to escape via the unoccupied anteroom region and thence to the flight cage, if she so chooses.

In another aspect, breeding box of the present invention is first attached by hooks at the exterior of a flight cage wherein two openings in the cage previously constructed, are aligned with the passageways of the anterooms of the breeding box. The anterooms are located in a common horizontal plane above the nesting arm. The male of the specie in the flight cage is most likely to explore the breeding box first. After a time (few days) of encouragement, the female will eventually settle in and stay in the box. The male will continue to go in and out of the box via the anteroom regions, feeding and courting the female. Once the female starts to lay eggs, maintaining a peaceful environment within the breeding box is essential. Quarrels can constantly occur. But as long as in these circumstances, the female has the option of escaping from the nesting arm irrespective of which entrance is used by the male, destructive behavior is avoided. Eggs are laid until a clutch of four to seven eggs occurs. These eggs are inspected daily via another separate opening (in the rear wall adjacent to nesting arm, such inspection occurring after a series of knocks on the walls encourages the female to leave the nest and go into the flight cage. Since the eggs must be turned each day (or the embryos will die), the calmer the enviroment about the nesting arm, the more likely the breeding cycle will successfully concluded. Incubation can start a few days after the eggs are laid. Usually the female will start to sit by the time there are two or three eggs. If she is reluctant, the male will actually chase her into the nesting arm. Many times, the parents will share sitting. The male will sit during the day and the female at night with the male standing guard at the anteroom region of the box. Since in these circumstances, the female has the option of escaping from the nesting arm irrespective of which entrance is used by the male, destructive behavior leading to broken eggs is avoided. The incubation period is usually less than a month. Normally an egg will hatch every other day in the order they were laid. The emerging chicks are initially housed within the nesting arm and are fed by both parents.

DETAILED DESCRIPTION OF A PREFERRED EMBODIMENT

Figure 1:
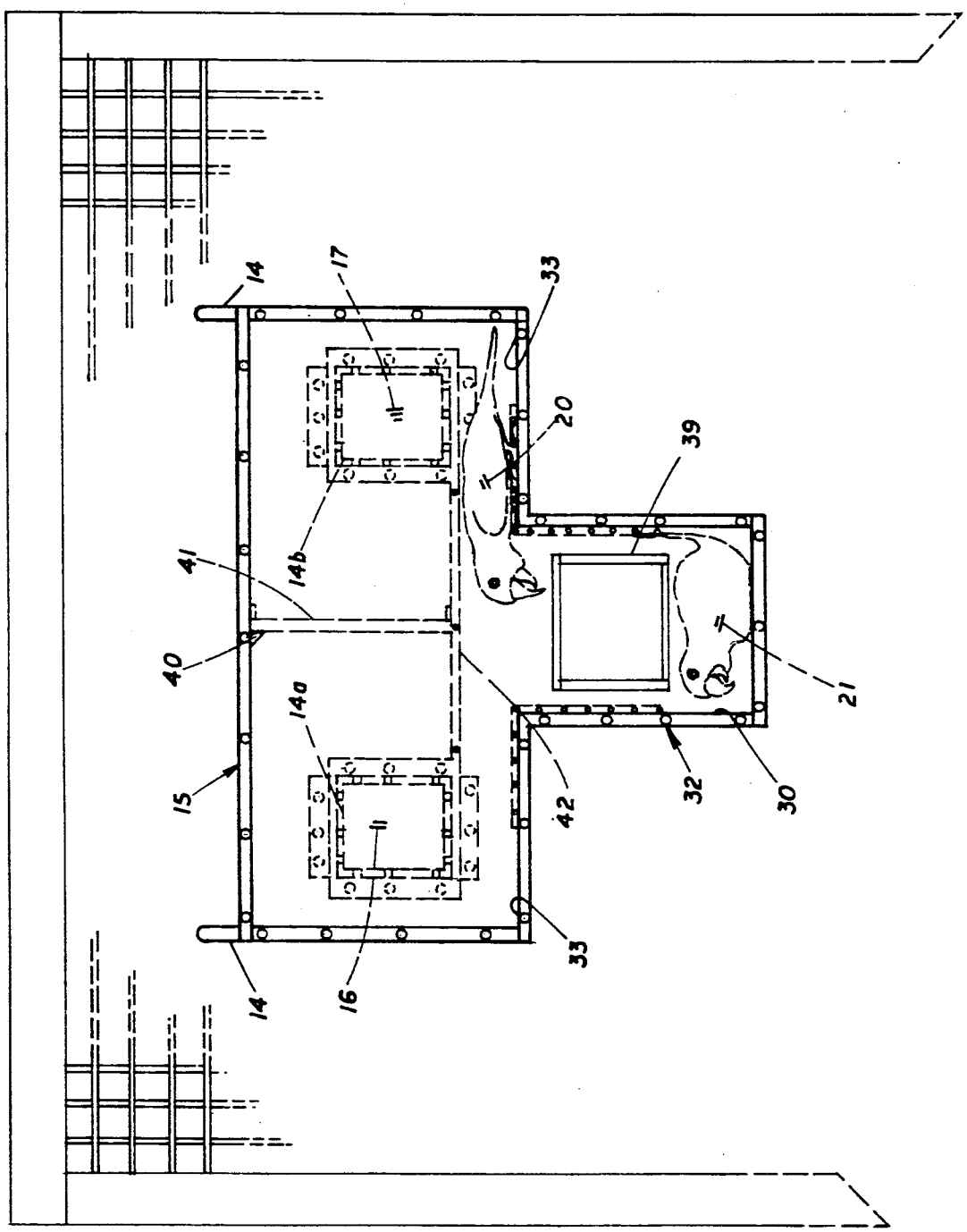
FIG. 1 is a rear elevational view of a conventional flight cage showing a pair of strong beaked cockatoos (in phantom line) within the breeding box of the present invention, the breeding box including a Tee-shaped central section mounted to the flight cage and enterable via a pair of openings also shown in phantom line.
Figure 4:
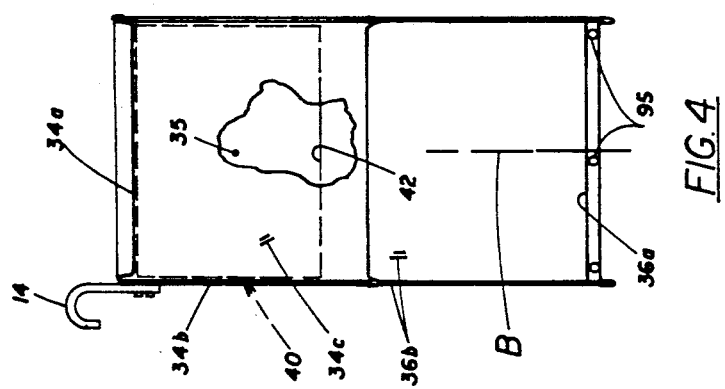
FIGS. 3 and 4 are top and side elevational views, respectively, of the breeding box of FIG. 2.
Figure 3:
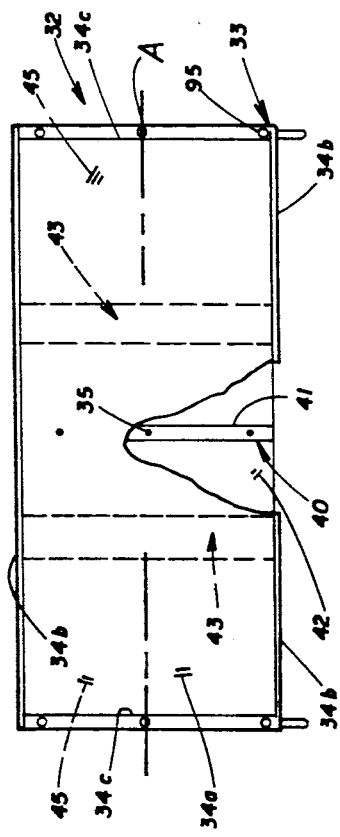
Figure 2:
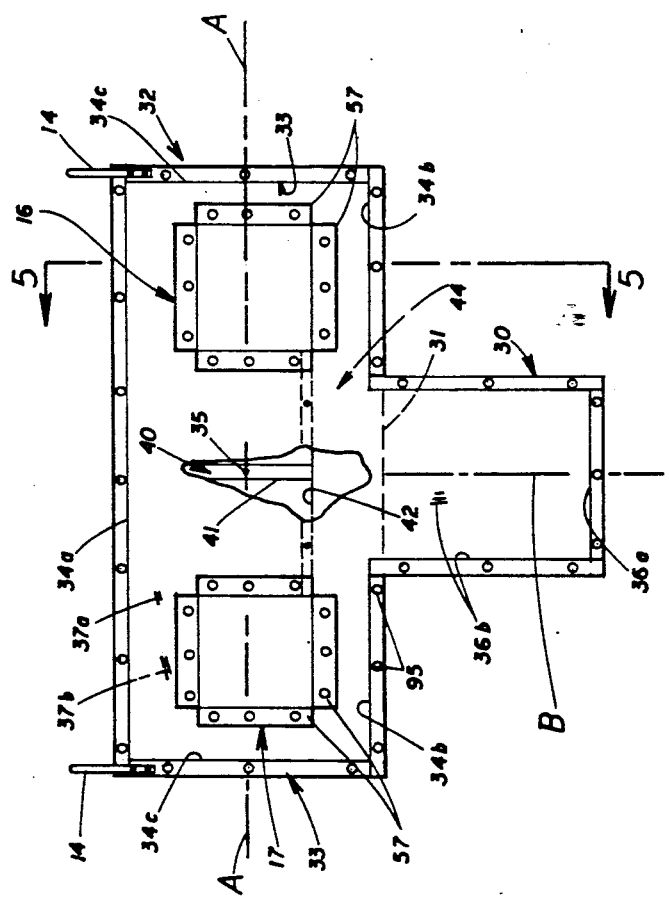
FIG. 2 is a detailed front elevational view of the breeding box of FIG. 1 showing the openings of the Tee-shaped central section by which the cockatoos gain entry from the flight cage in more detail, FIG. 2 also being partially cut-away to illustrate a Tee-shaped baffle that prevents direct passage of the birds from parallel arm to parallel arm of the Tee-shaped section.
Figure 7:
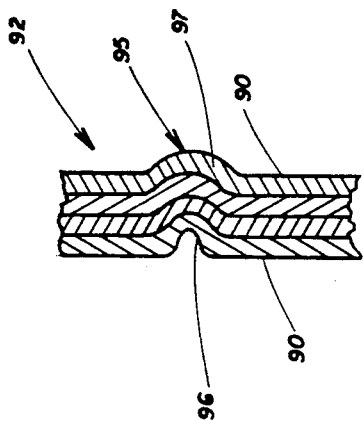
FIG. 7 is a section taken along line 7—7 of FIG. 5.
Figure 5:
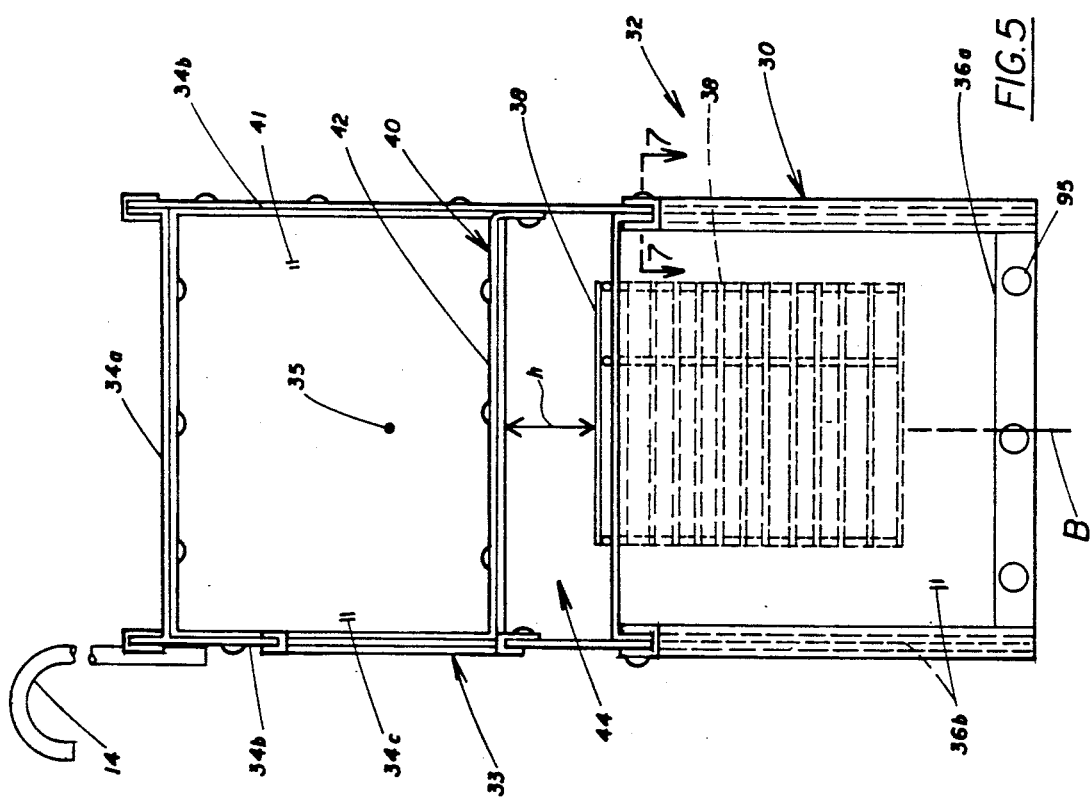
FIG. 5 is a section taken along line 5—5 of FIG. 2.

FIG. 1 shows a conventional flight cage 10 including an interlocking screen 11 attached to a metallic frame 12. Centered between side posts 13 of the frame 12 is breeding box 15 of the present invention. The breeding box 15 is usually attached to the rear wall 11a of the screen 11 as via a pair of hooks 14. The positioning of the breeding box 15 relative to the flight cage 10 is such that passageways 16 and 17 of the breeding box 15 are aligned with openings 14a and 14b cut in the screen 11. In that way, a male and female bird such as cockatoos 20 and 21, respectively, (shown in phantom lines) can enter and exit the box 15 via the aligned passageways 16, 17 and thence through the openings 14a and 14b cut in the screen 11 of the flight cage 10. The screen 11 is formed of rigid and thick enough wire to withstand the pressure of the ultra strong beaks of both the male 20 and female 21. For the same reason, the breeding box 15 is constructed of galvanized sheet metal say 1/32 in thickness in the manner thereinafter described.

In operation, the male 20 is most likely to explore the breeding box 15 first. After a time of encouragement, the female 21 will eventually settle in within a nesting arm 30 of Tee-shaped central section 32. The nesting arm 30 is seen to be positioned below a pair of parallel arms 33 formed of a series of wall panels described in detail below, one being penetrated by passageways 16, 17 previously described. The male 20 will continue to go in and out of the box 15 to the flight cage 10 via the passageways 16, 17, while simultaneously feeding and courting the female 21. Once the female 21 starts to lay eggs, maintaining a peaceful environment within the breeding box 15 is essential. Quarrels can and do constantly occur. But as long as in these circumstances, the female 21 has the option of escaping from the nesting arm 30 back to the flight cage 10, irrespective of which passageway 16, 17 is first used by the male 20, destructive behavior is avoided.

In accordance with the invention, a tee-shaped baffle 40 is attached to the parallel arms 33 of the Tee-shaped central segment 32 and includes a vertical segment 41 and a horizontal segment 42. As explained in more detail below, the purpose of the Tee-shaped baffle 40 is as follows. It limits direct passage of the male 20 from one of the parallel arms 33 to the other (bypassing the nesting arm 30), as when the female 21 is escaping from the nest arm 30. It does this by the fact that the vertical segment 41 forms a solid wall between the parallel arms 33. While at the same time, the horizontal segment 42 limits passage height for the male 20 relative to the nesting arm 30.

Eggs are laid until a clutch of four to seven eggs occurs. These eggs are inspected daily via a separate gated passageway 39 of the Tee-shaped central section 32. As shown, the passageway 39 is positioned adjacent to the nesting arm 30, such inspection occurring after a series of knocks encourages the female 21 to leave the nest and go into the flight cage 10. Since the eggs must be turned each day (or the embryos will die), the calmer the environment about the nesting arm 30, the more likely the breeding cycle will successfully concluded. Incubation can start a few days after the eggs are laid. Usually the female 21 will start to sit by the time there are two or three eggs. If she is reluctant, the male 20 will actually chase her into the nesting arm 30. Many times, the parents will share sitting. The male 20 will sit during the day and the female 21 at night with the male 20 standing guard at one of the passageways 16, 17 using a portion of the parallel arms 33 as a support, as explained below. Since in these circumstances, the female 21 has the option of escaping from the nesting arm 30 irrespective of direction of entry of the male 20 into arm 30, destructive behavior leading to broken eggs is avoided. The incubation period is usually less than a month. Normally an egg will hatch every other day in the order they were laid. The emerging chicks are initially housed within the nesting arm 30 and are fed by both parents.

FIGS. 2, 3, 4, 5 and 7 illustrate the Tee-shaped central section 32 and tee-shaped baffle 40 in still more detail.

As shown, the Tee-shaped central section 32 has the parallel arms 33 defining a substantially horizontal axis of symmetry A. The axis of symmetry A extends along both of the parallel arms 33 intersecting a central junction 35. Disposed about the junction 35 is a series of walls of the parallel arms 33 that includes the following: a top wall 34a, a series of side walls 34b and end walls 34c. Axis of symmetry B of the nesting arm 30 also intersects the junction 35. That is, the nesting arm 30 is normal to the parallel arms 33 wherein axes of symmetry A, B intersects each other at junction 35. The nesting arm 30 is seen to be formed of bottom wall 36a and a series of side walls 36b. Note that the vertical upright side walls 34b of the parallel arms 33 and the exterior upright side walls 36b of the nesting arm 30 are integrally formed using a pair of front and rear Tee-shaped wall panels 37a, 37b in the manner described below in association with the method aspects of the present invention.

The tee-shaped baffle 40 includes vertical segment 41 and horizontal segment 42. The vertical segment 41 defines a vertical plane coincident with axis of symmetry B of the nesting arm 30. The Tee-shaped baffle 40 limits direct passage of the captive birds from one of the parallel arms 33 to the other wherein the birds could bypass the nesting arm 30 by jumping across mouth 31 of the latter. It does this by the fact that the vertical segment 41 forms a solid wall between the arms 33 that is defined by a vertical plane coincident with the axis of symmetry B. Such a vertical plane also bisects the nesting arm 30. While at the same time, the horizontal segment 42 limits passage height for the birds to a value h, see FIG. 5, that only permits the birds to crawl along the arms 33 in the vicinity of the mouth 31 of the nesting arm 30 and does not allow them enough space to jump across the mouth 31. Hence to traverse the parallel arms 33, the male must crawl down into the nesting arm 30 with his head exposed via one of the ladders 38 attached to the nesting and parallel arms 30, 33, see FIG. 5. In addition, the length of the horizontal segment 42 is such as to form a pair of complementary overhang portions 43, see FIG. 3. These overhang portions 43 provide limited crawl space 44, see FIG. 5, for the purposes previously mentioned. An additional bonus of such overhang portions 43 is that they also reduce the speed that the male can traverse the parallel arms 33. However, each complementary portion 43 still leaves sufficient floor space in the vicinity of passageways 16, 17 so as form a pair of surveillance anteroom regions 45, see FIG. 3, for the male. Note that the male, when on guard duty, uses a horizontal side wall 34b of the parallel arms 33 (in the region 45) as a floor to observe and maintain surveillance of the both the nesting arm 30 via the crawl space 44 and the flight cage 10 via passageway 16 or 17. Each of the anteroom regions 45 is positioned above and offset from said nesting arm 30. In a typical construction, h is about 5½ inches; each overhang portion 43 is about 3¼ inches; and the total length of the horizontal segment 42 is about 18 inches. The length of each anteroom region 45 spanning each overhang portion 43 to the side walls 36b is about 9 inches.

METHOD OF ASSEMBLY

Figure 6:
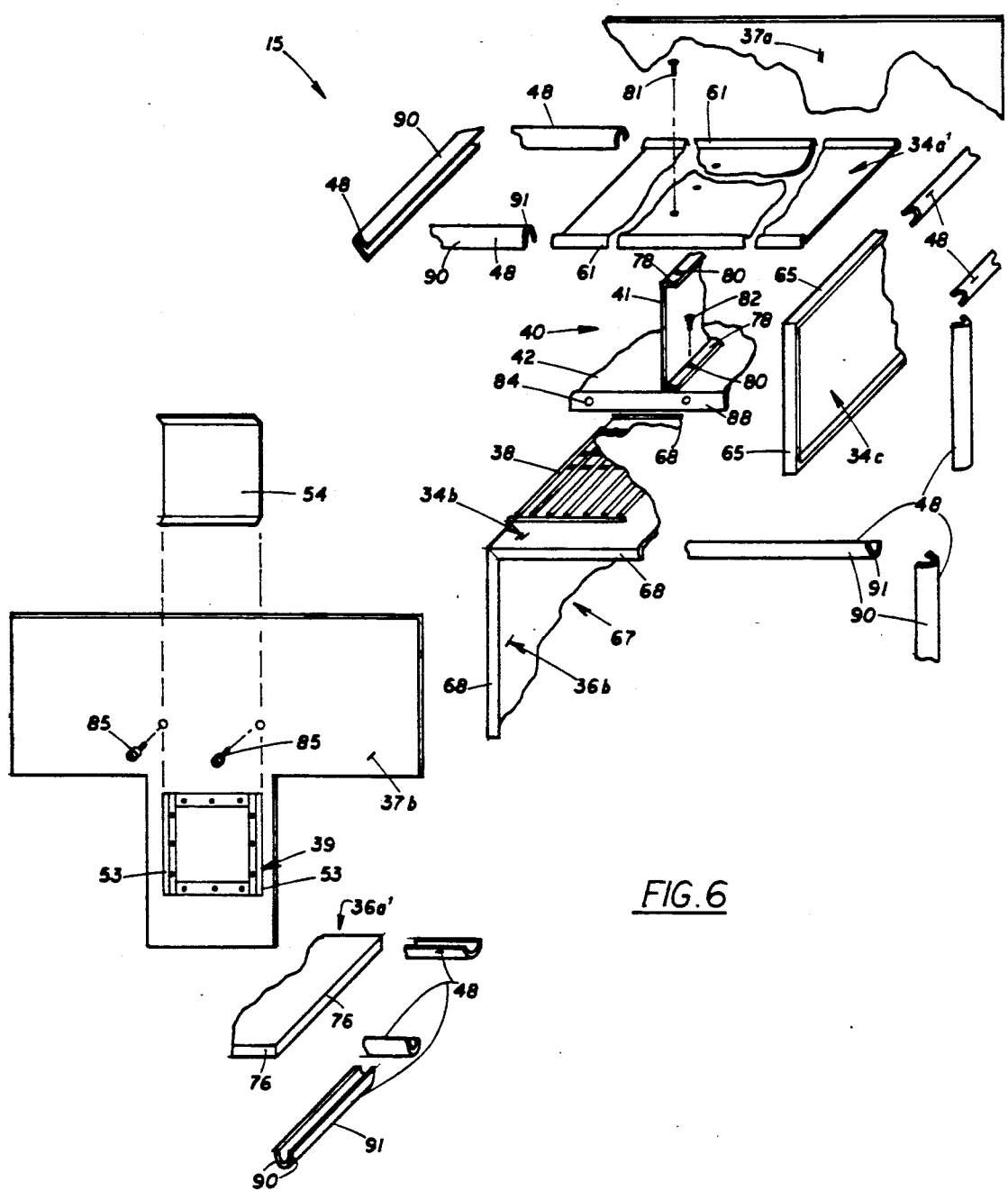
FIG. 6 is an exploded perspective view of breeding box of FIGS. 1-4 showing the method of assembly.

FIG. 6 illustrates the method of assembly of the breeding box 15. Briefly, the steps of the method include the following.

First, the panels comprising the box 15 are provided with correct edges to mate with correct corresponding panels. In this regard, only the front and rear wall panels 37a, 37b are not provided with folded edges. The remainder of the panels as shown in FIG. 6 are formed with folded edges.

Next, groups or sets of the edged panels are positioned in edged alignment usually starting from the top and proceeding down to receive in sequence a plurality of V-shaped cover stays 48. Each stay 48 includes sides 90 originating from a vee center 91. With a stay 48 placed about a particular edged alignment of the panels, the result is a sandwich 92, see FIG. 7, that includes outer sides 90 of the stay 48 forming the outer panels of the sandwich 92, a single ply edge of one of the coupled panels and a single ply edge of another of the panels as the encased material. Then the sandwich 92 is crimped at spaced locations along each of the stays 48 using a crimping pliers such as manufactured by Malco Products, Annadale, Minn., Model SL-1, in which the tips of the pliers are provided with a conical cavity and a smaller cylindrical plug. The result of sequential closure of the crimping pliers is a series of button crimps 95 along the edges of the breeding box 15, as shown in FIGS. 1-5. The characteristics of each button crimp 95 is in most part determined by it method of formation as shown in detail in FIG. 7. Opposed sides 90 of each Vee stay 48 is initially contacted by the plug and cavity segments of the pliers. Then with movement of the pliers, the plug is driven into surface contact with one of the sides 90 of the stay 48, thence in contact with either of the single ply encased edges and thence in the other edge of the aligned panel. The remaining side 90 of the Vee stay 48 is moved into contact with the cavity of the pliers. As a result, an interior, concave bubble 96 is formed where the plug of the pliers made contact and an outwardly directed a concave cap 97 is constructed where the cavity segment of the pliers rested.

In order to better understand the characteristics of the assembly, a detail examination of each of the panels of the breeding box 15 is in order and is presented now in association with FIGS. 1-7.

FRONT AND REAR WALL PANELS 37a, 37b

FIG. 6 illustrates in more detail front and rear Tee-shaped front and rear wall panels 37a, 37b. As shown, each wall panel 37a, 37b is Tee-shaped in plan view. When assembled, they form upright vertical side walls 34b of the parallel arms 33 and exterior upright side walls 36b of the nesting arm 30 of FIGS. 1-5. The rear wall panel 37b includes the gated passageway 39 that includes a pair of U-shaped channels 53 attached to opposite sides of the passageway 39, and a planar gate member 54 with upturned edges 55, the gate member 54 being slidable within the channels 53. The front wall panel 37a includes the passageways 16, 17 previously mentioned, the latter being edged with U shaped trim members 57 to prevent injury, see FIG. 2.

TOP WALL PANEL 34a'

Top wall panel 34a' of the breeding box 15 is seen to be rectangularly shaped in plan view and is provided with outwardly directed single ply edges 61 along opposite longer sides. When assembled, the top wall panel 34a' forms the top wall 34a of the parallel arms 33 of FIGS. 1-5.

END WALL PANELS 34c'

In the construction of the breeding box 15, a pair of end wall panels 34c' are used, but since they are identical only one need be described in detail. As shown, the end wall panel 34c' is seen to be rectangularly shaped in plan view. It also includes outwardly directed single ply edges 65 along both its long and short sides. When assembled, the end wall panels 34c' form the end walls 34c of the parallel arm 33 of FIGS. 1-5.

UPRIGHT L-SHAPED PANELS 67

In the construction of the breeding box 15, a pair of L shaped panels 67 are used, but since they are identical only one need be described in detail. As shown, the L-shaped panel 67 is seen to be provided with outwardly directed single ply edges 68 along opposite sides. When assembled, the pair of L-shaped panels 67 form the horizontal flat side walls 34b of the parallel arms 33 and the interior upright side walls 36b of the nesting arm 30, respectively of FIGS. 1-5. Note also that horizontal segment of each L-shaped panel 67 also forms the floor of the anteroom region 45 to which the L-shaped ladder 38 is attached, as by spot-welding.

BOTTOM WALL PANEL 36a'

In FIG. 6, bottom wall panel 36a' used in the construction of the box 15 is seen to be also rectangularly shaped in plan view and is provided with outwardly directed single ply edges 76 along all of its sides. When assembled, the bottom wall panel 36' forms the bottom wall 36a of the nesting arm 30 of FIGS. 1-5.

INTERIOR BAFFLE 40

As indicated in FIG. 6, vertical segment 41 of the L-shaped baffle 40 is also seen to be rectangularly shaped in plan view and is provided with outwardly directed single ply edges 78 along opposite sides having two series of openings 80 through which two sets of pop rivets 81, 82 penetrate. The rivets 81 attach the vertical segment 41 to the top wall panel 34a'; the set of rivets 82 attach the vertical segment 41 to the horizontal segment 42 of the baffle 40. When assembled, the vertical segment 41 forms the vertical solid wall between the parallel arms 33 of FIGS. 1-5.

As in FIG. 6, horizontal segment 42 of the L-shaped baffle 40 is also rectangularly shaped in plan view and is provided with outwardly directed single ply edges 83 along opposite sides. The edges 83 also having a series of openings 84 through which rivets 85 can penetrate to fix the horizontal segment 42 relative to the front and back wall panels 37a, 37b. When assembled, the horizontal segment 42 forms the overhang regions 44 between the parallel arms 33 and nesting arm 30 of FIGS. 1-5.

It is understood that various modifications and substitutions may be made in connection with the invention as described herein by those skilled in the art without departing from the spirit and scope of the following claims.

What is claimed is:

1. A breeding box for use with a conventional cage to aid breeding of strong beaked birds wherein male bird aggression is temporized, comprising:
   (i) a Tee-shaped central section having a pair of parallel arms defining an axis of symmetry and a transverse nesting arm normal to said pair of parallel arms and said axis of symmetry, said parallel arms defining a pair of spaced apart anteroom regions, each of which being positioned offset from said nesting arm and having a normally open external passageway to permit external entry and egress relative to said Tee-shaped central section,
   (ii) a tee-shaped baffle positioned near a junction of said parallel arms and said nesting arm, in edge contact with said parallel arms whereby direct passage from parallel arm to parallel arm bypassing said nesting arm is prevented, wherein a sitting female within said nesting arm is provided with an escape option whereby male aggression can be temporized without disruption of the breeding cycle.

2. The box of claim 1 in which said baffle is positioned at said junction of said three arms and includes a first element in attachment to a second element, said first element forming a solid wall between said parallel arms as well as defining a plane intersecting said nesting arm, said second element defining a plane within said parallel arms whereby passage height normal to said axis of symmetry of said parallel arms is limited to a value h that only permits a bird to crawl into said nesting arm with his head exposed.

3. The box of claim 2 in which said second element of said baffle extends parallel to said axis of symmetry of said parallel arms and has first and second ends that overhang said anteroom regions, to define a passage length that together with said passage height h defines a crawl space that limits speedy travel between said anteroom regions and said nesting arm.

4. The box of claim 3 in which said overhang length is about 3¼ inches and h is about 5½ inches.

5. The box of claim 4 wherein total length of said second element is about 18 inches.

6. The box of claim 2 in which said first element of said baffle attaches at three edges to said parallel arms and has a fourth edge attached to said second element of said baffle.

7. The box of claim 6 in which said first element of said baffle defines an axis of symmetry normal to said axis of symmetry of said parallel arms.

8. The box of claim 7 in which said axis of symmetry of said first element of said baffle is coincident with that of said nesting arm.

9. The box of claim 1 with the addition of ladder means attached to a wall of said nesting arm to facilitate entry and egress relative to said nesting arm and said anteroom regions.

10. The box of claim 1 with the addition of hook means attached to said Tee-shaped central section to disconnectably connect said breeding box to a conventional cage wherein said anteroom regions of said parallel arms are positioned above and offset from said nesting arm but provide guard positions for said male to observe both external and internal movements relative to said breeding box.

11. A method of using a breeding box in association with a conventional cage to aid breeding of strong beaked birds wherein male bird aggression is temporized, said breeding box comprising:
   (i) a Tee-shaped central section having a pair of parallel arms defining an axis of symmetry and a transverse nesting arm normal to said pair of parallel arms and said axis of symmetry, said parallel arms defining a pair of spaced apart anteroom regions, each of which being positioned offset from said nesting arm and having a normally open external passageway to permit external entry and egress relative to said Tee-shaped central section and said conventional cage,
   (ii) a tee-shaped baffle positioned near a junction of said parallel arms and said nesting arm, in edge contact with said parallel arms whereby direct passage from parallel arm to parallel arm bypassing said nesting arm is prevented, wherein a sitting female within said nesting arm is provided with an escape option whereby male aggression can be temporized without disruption of the breeding cycle, said method comprising the steps of:
   (1) constructing a pair of openings through said conventional cage,
   (2) mounting the breeding box to said conventional cage at the exterior thereof wherein the pair of openings of step (1) are aligned with the passageways of the anteroom regions of the breeding box;
   (3) preventing direct interior passage from parallel arm to parallel arm bypassing said nesting arm so as to provide a peaceful environment within the breeding box wherein the female has the option of escaping from the nesting arm irrespective of which entrance from the conventional cage to the breeding box is used by the male so that interruption of the breeding cycle is avoided.

12. The method of claim 11 with an additional step of knocking on the nesting arm to encourage the female to leave the nest, opening a gate to the nesting arm and inspecting the eggs.

13. The method of claim 12 in which the additional step of inspecting the eggs is to determine that the eggs are turned periodically.

14. The method of claim 13 in which broken eggs that may keep the female from turning the eggs, are removed.

15. A breeding box for use with a conventional cage to aid breeding of strong beaked birds wherein male bird aggression is temporized, comprising:
   (i) a Tee-shaped central section having a pair of parallel arms and a transverse nesting arm normal to said pair of parallel arms, said parallel arms defining a pair of spaced apart anteroom regions, each of which being positioned offset from said nesting arm and having a normally open external passageway to permit external entry and egress relative to said Tee-shaped central section,
   (ii) a tee-shaped baffle positioned in edge contact with said parallel arms whereby direct passage from parallel arm to parallel arm bypassing said nesting arm is prevented, wherein a sitting female within said nesting arm is provided with an escape option whereby male aggression can be temporized without disruption of the breeding cycle.

16. The box of claim 15 in which said baffle is positioned at a central junction of said three arms and includes a first element in attachment to a second element, said first element forming a solid wall through said junction as well as defining a plane intersecting said nesting arm, said second element defining a plane within said parallel arms whereby passage height between said parallel arms is limited to a value h that only permits a bird to crawl into said nesting arm with his head exposed.

17. The box of claim 16 in which said second element of said baffle extends parallel to an axis of symmetry of said parallel arms and has first and second ends that overhang said anteroom regions, to define a passage length that together with said passage height h defines a crawl space that limits speedy travel between said anteroom regions and said nesting arm.

18. The box of claim 15 with the addition of ladder means attached to a wall of said nesting arm to facilitate entry and egress relative to said nesting arm and said anteroom regions.

* * * * *